United States Patent [19]

Beck

[11] Patent Number: 4,543,017

[45] Date of Patent: Sep. 24, 1985

[54] APPARATUS FOR THE CONTROL FOR INJECTION OF DRY SOLIDS INTO A HIGH PRESSURE FLUID STREAM

[75] Inventor: Jeffrey L. Beck, Ponca City, Okla.

[73] Assignee: Conoco Inc., Ponca City, Okla.

[21] Appl. No.: 519,474

[22] Filed: Aug. 1, 1983

[51] Int. Cl.[4] ............................................. B65G 53/30
[52] U.S. Cl. ...................................... 406/31; 406/98; 406/132
[58] Field of Search ...................... 406/31, 56, 57, 58, 406/98, 102, 105, 108, 122, 132, 144, 153; 417/171

[56] References Cited

U.S. PATENT DOCUMENTS

| 845,919 | 3/1907 | Arcouet | 406/132 X |
|---|---|---|---|
| 3,053,420 | 9/1962 | De Saint-Martin | 406/132 X |
| 3,514,217 | 5/1970 | Reiss | 406/31 X |
| 4,114,955 | 9/1978 | Araoka | 406/98 |

FOREIGN PATENT DOCUMENTS 2007037 9/1970 Fed. Rep. of Germany ...... 406/102
2089668 6/1982 United Kingdom .

Primary Examiner—Jeffrey V. Nase
Attorney, Agent, or Firm—William J. Miller

[57] ABSTRACT

A vortex chamber is disclosed which has a circular elliptical or volute perimeter and end wall. High pressure fluid enters tangentially at the perimeter. Part of this high pressure fluid exits at an axial outlet, forming a vortex. The balance of the high pressure fluid exits at a second tangential outlet at the perimeter. Dry solids are fed into a hopper which is connected to a second axial inlet. The axial inlet should be smaller than the axial outlet, and the two may be concentric. Once the solids enter the vortex chamber, some of them move to the perimeter due to centrifugal force. Once at the perimeter, the solids exit at the tangential outlet.

4 Claims, 9 Drawing Figures

4,543,017

APPARATUS FOR THE CONTROL FOR INJECTION OF DRY SOLIDS INTO A HIGH PRESSURE FLUID STREAM

RELATED APPLICATIONS

U.S. patent application Ser. No. 218,857, now U.S. Pat. No. 4,449,862, entitled "Vortex Injection Method and Apparatus", and U.S. patent application Ser. No. 231,637, now U.S. Pat. No. 4,409,746, entitled "Dredging Device", are both by Jeffrey L. Beck and are assigned to the same assignee as this invention.

PRIOR ART

The best prior art known to applicant includes the above-referenced applications along with German Pat. No. 1,174,696 issued July 23, 1964. This patent discloses a cylindrical chamber for tangential inlet and outlet and an axial input. It does not have a second axial outlet and, furthermore, has no means for forming a low pressure vortex. English Pat. No. 735,900 illustrates a cylindrical-type chamber having an inlet for dry solids along with a tangential inlet and outlet. The apparatus differs from the subject matter of this application in a radical sense in that it includes an impeller on the inside of the apparatus for moving the dry solids material into a vortex stream. U.S. Pat. No. 4,114,955 to Araoka is very similar to the above-referenced British patent.

BRIEF DESCRIPTION OF THE INVENTION

The basic difference between this invention and the prior art is that a cylindrical chamber which has a tangential inlet and outlet forms a very low pressure vortex at its axis by providing a fluid outlet at the axis. The low pressure vortex has a hopper positioned over it for the insertion of dry solids. Sufficient fluid is exiting the low pressure outlet so that the dry solids inlet will not have fluids forcing its way out of the low pressure inlet. The apparatus does not require any form of internal rotating impeller which is subject to high wear and subsequent breakage when dry solids are fed into such a configuration.

DETAILED DESCRIPTION OF THE INVENTION

Figure 1:
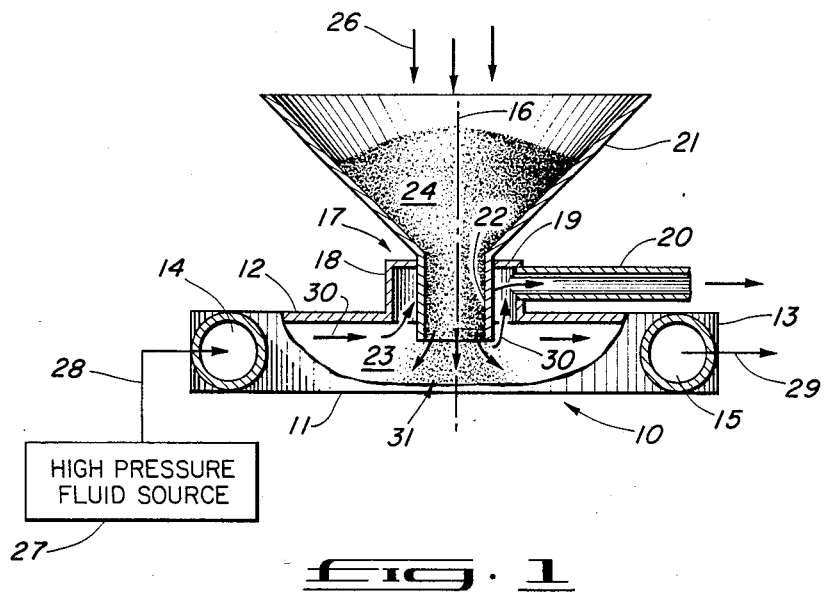
FIG. 1 is a side view in partial section of a cylindrical chamber illustrating the tangential inlet and outlet along with a low pressure outlet and a dry solids inlet.

Referring to all of the figures but in particular to FIG. 1, a cylindrical chamber generally referred to as 10 has a bottom 11, a top 12 and side walls 13. While the chamber is shown in this disclosure to be cylindrical, it can also include configurations which are elliptical or volute.

A high pressure tangential inlet 14 is attached to the side wall 13 of chamber 10. A high pressure tangential outlet 15 is, likewise, attached to cylindrical chamber 10 through side wall 13. Cylindrical chamber 10 has axis 16. A low pressure outlet 17 is attached through the end wall 12 along axis 16 and in the illustrated apparatus has a vertical cylindrical side wall 18 and end 19. A low pressure pipe 20 mounted through side wall 18 provides a means for fluid to escape from the inside of cylindrical chamber 10. A hopper 21 has its outlet 22 mounted axially through the end 19 and extends into interior 23 of cylindrical chamber 10. Solids 24 are placed within hopper 21 along the direction of arrows 26. A high pressure fluid source 27 which may be a pummp is coupled through any means 28 to high pressure inlet 14. High pressure fluid outlet 15 is coupled as indicated by arrow 29 by any means to a subsequent process apparatus or pipeline for conveyance to a remote location.

FIG. 1 operates as follows: High pressure fluid source 27 couples high pressure fluid through means 28 into the high pressure inlet 14. The fluid then moves around the interior 23 of cylindrical chamber 10 in a circular manner exiting at two locations, the first being the high pressure outlet 15 and through means 29 to subsequent remote locations. A portion of the fluid is permitted to exit pipe 20 by moving along the direction of arrows 30 into the vertical cylindrical chamber formed by side walls 18 and end 19. The movement of the low pressure fluid out of pipe 20 creates a low pressure vortex region indicated by arrow 31. This low pressure vortex permits the injection of dry solids 24 which are deposited along the direction of arrow 26 into hopper 21 which subsequently passes into the hopper outlet 22 and into the vortex region 31. Once the dry solids enter the vortex region 31, the rotating fluids sling the material by centrifugal force to the outside of the cylindrical chamber 10 where it is carried by the high pressure inlet 14 to the high pressure outlet 15.

Figure 2:
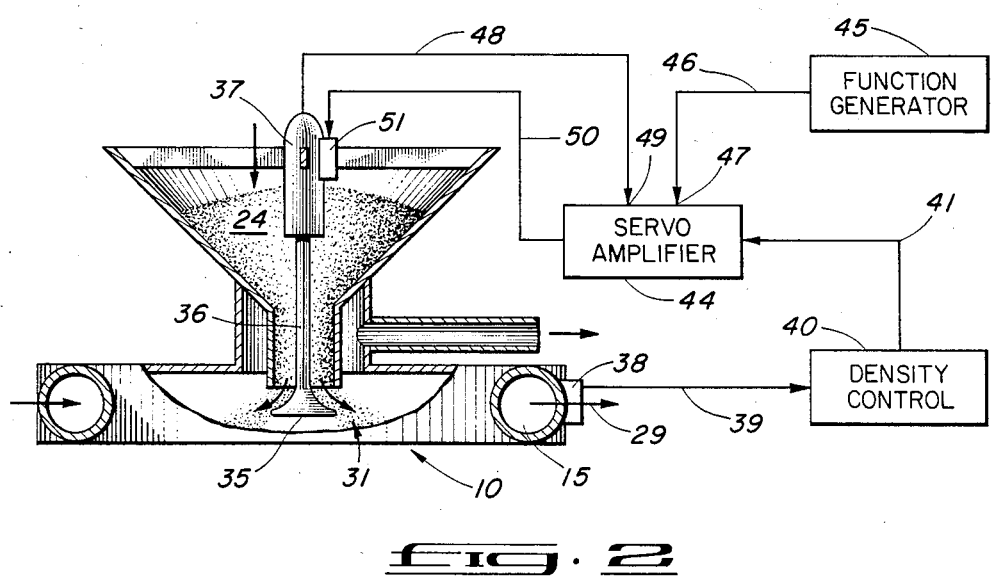
FIG. 2 is a modification of FIG. 1 which provides for a controlled dry solids inlet.

Referring to FIG. 2, a modified version of the apparatus shown in FIG. 1 is illustrated. This apparatus permits the controlled injection of solids into the cylindrical chamber 10 by providing a form of closure in the form of valve 35 which is coupled through a rod 36 to a valve actuator mechanism 37. The apparatus tends to maintain the density at a more uniform rate. The density control is provided by a densitometer 37 coupled through a means such as wires 39 to a proportional and integral density control unit 40. The output of density control unit 40 is applied through a means 41 to a servo amplifier 44. A function generator 45 is coupled through a means 46 to another input 47 of servo amplifier 44. A feedback circuit from actuator mechanism 37 is provided through a wire or other means 48 to another input 49 of servo amplifier 44. The output of servo amplifier 44 is coupled through means 50 to control valve 51 which controls the operation of actuator mechanism 37. The power source for actuator mechanism 37 is not illustrated and can be electrical, hydraulic, compressed air, or any other well known method for driving an actuator mechanism.

OPERATION

The basic operation of the unit illustrated in FIG. 2 is identical to that illustrated in FIG. 1 and will not be described again; however, the control portion of FIG. 2 is described as set out below:

As material along with fluid is entering high pressure outlet 15, densitometer 35 is measuring the ratio of solids 24 injected into the vortex 31 of cylindrical chamber 10 which has mixed with the high pressure fluid rotating around chamber 10 which is now entering high pressure outlet 15. This measure of density is communicated through means 39 to density control unit 40. Density control unit 40 has been set to maintain a particular density for discharge through high pressure outlet 15. Any variation in this density results in a change in an output that is communicated through means 43 to servo amplifier 44. A function generator 45 which may be, for example, a sine wave generator and may also have a variation in frequency, communicates through means 46 to the input 47 of servo amplifier 44. The servo amplifier combines the inputs from means 41 and 46 and the feedback from actuator mechanism 37 via means 48 to produce an output that is communicated to control valve 51 via means 50. At a particular density actuator mechanism 37 is causing rod 36 to move either down to provide more injection of solids 24 into the vortex or upward to reduce the flow of such material. The function generator may also cause actuator mechanism 27 to constantly vibrate up and down at a low amplitude to provide the same form of control. The agitation formed by valve 35 will cause more or less material to be moved into vortex 31. Furthermore, a combination of movement of valve rod 36 and vibration can be incorporated as means for controlling the movement of material 24 into the vortex 31. The actual movement of actuator mechanism 37 is provided by a feedback wire 48 to input 49 of servo amplifier 44. This tends to stabilize the servo controlled amplifier and actuator control valve 51.

Figure 3:
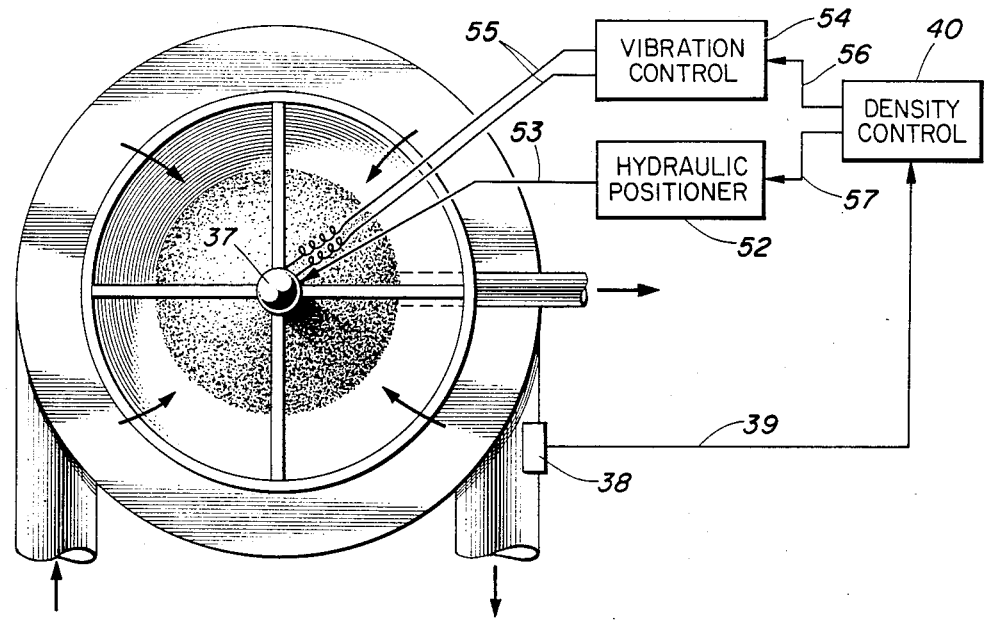
FIG. 3 is a top view of the apparatus disclosed in FIG. 2.

FIG. 3 differs from FIG. 2 only in that it illustrates the hydraulic positioner 52 coupled through hydraulic lines 53 to the actuator mechanism 37 and an electrical vibration control 54 coupled through lines 55 to the actuator mechanism 37.

As previously discussed densitometer 38 is coupled through means 39 to the input of density control circuit 40. Here, however, density control circuit 40 is coupled through wires 56 and 57 to the electrical vibrator control circuit 54 and the hydraulic positioner 52, respectively. The operation of the apparatus is similar to that disclosed in FIG. 2 with the exception that the hydraulic positioner provides a fixed movement for valve 35 (see FIG. 2) and the vibration control 54 through wires 55 provide a constant vibration or agitation to valve 35.

Figure 4:
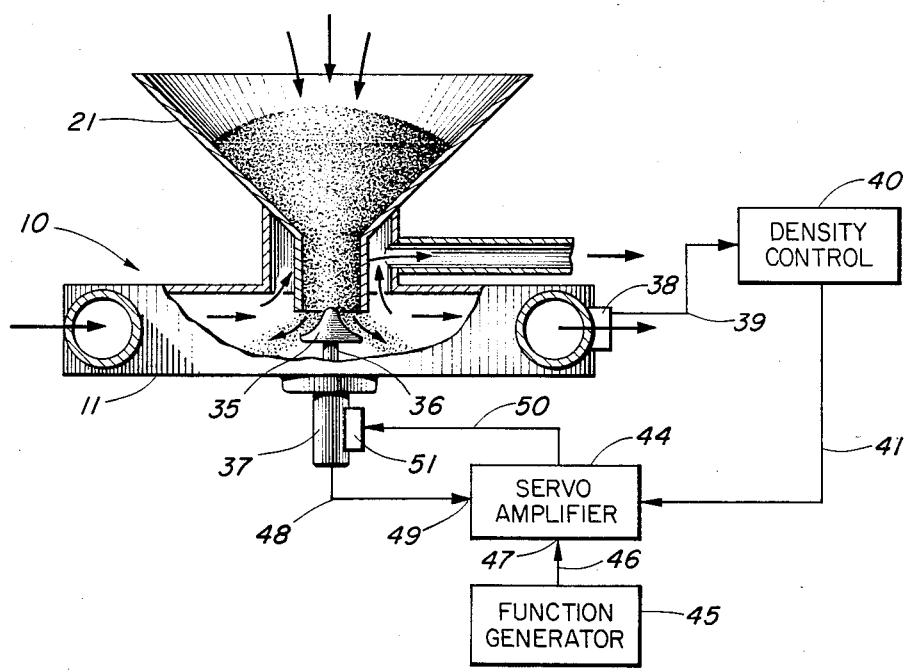
FIG. 4 is a modified version of the apparatus shown in FIG. 2.

FIG. 4 illustrates a modified version of the apparatus illustrated in FIGS. 2 and 3 and differs only in that the actuator 37 is mounted on the bottom 11 of cylindrical chamber 10 and the rod 36 extends through the bottom 11 and has valve 35 attached thereto axially under the hopper 21. The densitometer 38 is similarly coupled through wire 39 to density control unit 42 which is outputted through wire 41 to servo amplifier 44. The output from 44 is provided as previously described through wire 50 to control valve 51. Function generator 45 is, likewise, coupled through means 46 to the input 47 of servo amplifier 44. Feedback, as previously described, is coupled through wire 48 to input 49 of servo amplifier 44. The circuit operates in the same manner as that described in FIGS. 2 and 3.

FIGS. 5 through 8 show various modified configuration of the apparatus described in FIGS. 1 through 4.

Figure 5:
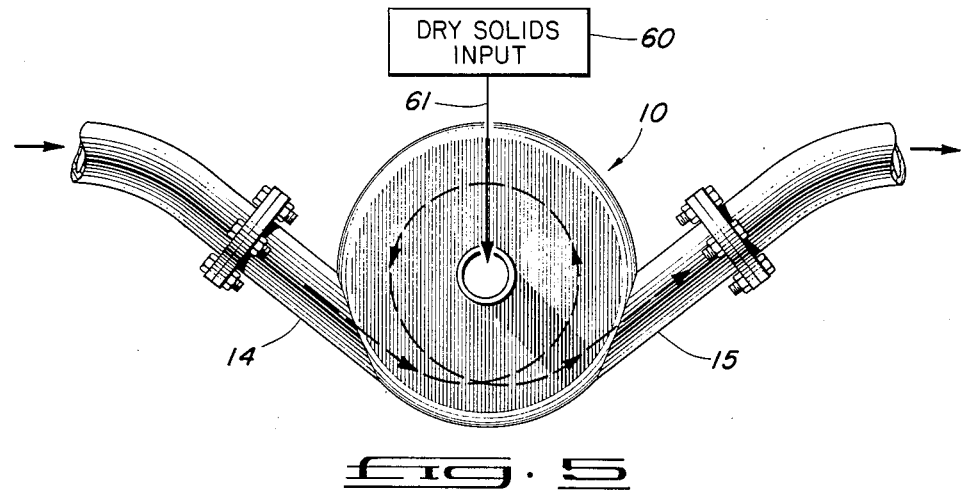
FIG. 5 is a modified method for installing the inlet and outlet high pressure pipes.

Referring specifically to FIG. 5 the cylindrical chamber 10 is mounted vertically with tangential input 14 and tangential output 15 attached in a means to provide the least used space so that in an embodiment such as a mine the unit can be installed in as little space as possible. The evacuation in a mine is extremely expensive and complex. The manner of configuration in tangential inputs and outputs provides for a minimum size of the unit and minimum space when installed. The dry solids input 60 is coupled through any means 61 as subsequently described in detail. The operation of the device is similar to that described for the previous figures.

Figures 6A, 6B:
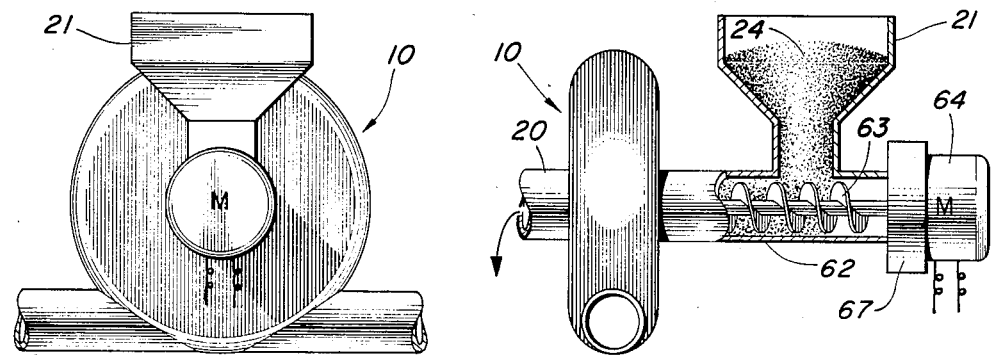
FIGS. 6a and 6b illustrate means for mounting the apparatus vertically and injecting the solids through the use of an auger.

FIGS. 6a and 6b illustrate one means for injecting dry solids when the cylindrical chamber 10 is mounted vertically. Here the hopper 21 is attached over a cylindrical pipe 612 which has an auger 63 mounted therein. The drive shaft of auger 63 is coupled through speed reducer 67 to any power source 64 such as an electric motor. It is obvious that the motor can be hydraulic or pneumatic. Dry solids 24 are deposited in hopper 21 in the normal manner and fall onto auger 63. Motor 64 then causes auger 63 to rotate moving the solids into the cylindrical chamber 10. Since the vortex at the auger of cylindrical chamber 10 is very low pressure, auger 63 does not have to incorporate any special features to assure its being sealed against leakage. It may incorporate some form of valve during shutdown periods to prevent fluids from flowing backwards. Such a valve is not illustrated. Pipe 20 is illustrated and shown as being mounted on the opposite side of cylindrical chamber 10; however, its function is the same as that described in FIGS. 1 through 3.

Figures 7, 8:
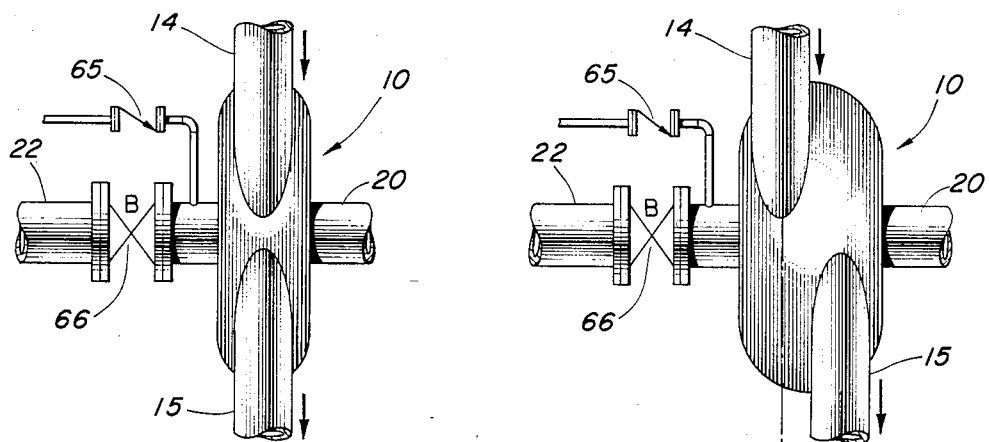
FIG. 7 is a side view of one means for attaching the high pressure inlet and outlet pipes.
FIG. 8 is a modified apparatus illustrated in FIG. 7.

FIGS. 7 and 8 illustrate various means for attaching the inlet and outlet high pressure pipes 14 and 15, respectively. FIGS. 7 and 8 also illustrate a vacuum break 65 which prevents or tries to prevent cavitation inside cylindrical chamber 10. The input material at 65 can either be air or fluids. Ball valve 66 provides a means for shutting off the low pressure inlet 22 for dry solids. The valve, as previously mentioned, can be used to either control the rate of entry of the material or to prevent fluids backing up into inlet 22 during shutdown of the system.

FIG. 8 showing a high pressure inlet 14 is shown staggered by an amount delta d from high pressure outlet 15. The staggered location of the inlet and outlet pipe provides better mixing of the dry solids since the fluids must make more rotations inside chamber 10 prior to entry through high pressure outlet 15. The additional rotation provides longer time for the solids to mix with the high velocity fluids rotating around chamber 10.

It is obvious that changes can be made in the application and still be within the spirit and scope of the invention as disclosed in the specification and appended claims.

What is claimed is:

1. Apparatus for the injection of dry solids into a high pressure fluid stream comprising:
    (a) a chamber formed with an axis and having a cylindrical side wall, a top and a bottom;
    (b) a high pressure fluid inlet means mounted tangentially through said cylindrical side wall;
    (c) a high pressure fluid outlet means mounted tangentially through said cylindrical side wall;
    (d) hopper means mounted over said top and having an outlet extending through said top and into said chamber, said hopper outlet aligned with the axis of said chamber, said hopper means adapted to receive dry solids for flow to deposit said dry solids into said chamber;

(e) low pressure fluid outlet means mounted to said chamber and communicating with the internal region proximate the axis of said chamber; and (f) valve means mounted across the outlet of said hopper means including a valve control means that is actuatable to control the amount of particulate solids passing from said hopper means into said chamber; means for vibrating the valve means to effect controlled vibration of the valve means, the amplitude of vibrations of the valve means being controlled by said valve control means;

whereby a portion of the fluids entering said high pressure inlet means will exit said low pressure outlet means forming a vortex proximate the axis of said chamber thereby permitting the entry of dry solids for mixing with high pressure fluid for outlet flow through said high pressure fluid outlet means.

2. Apparatus as described in claim 1 wherein said valve control means is a circuit comprising:

(a) a density measuring means attached to said high pressure fluid outlet means and generating an output signal responsive to the solid to fluid ratio leaving said chamber;

(b) density control means receiving the signal from said density measuring means and generating an output;

(c) servo amplifier means which is coupled to an output of said density control means;

(d) function generator means generating an output which is coupled to an input of said servo amplifier means for applying a predetermined signal to said servo amplifier;

(e) valve actuation means;

(f) means coupling the output signal from said servo amplifier means to said valve actuation means whereby said valve control means will control the position of said valve in response to said measured density in order to keep said density at a predetermined value.

3. Apparatus as described in claim 2 wherein said valve means is mounted through the bottom of said chamber.

4. Apparatus as described in claim 2 wherein said valve means is mounted in said hopper means outlet aligned with the axis of said chamber.

* * * * *